United States Patent Office 3,443,474
Patented May 13, 1969

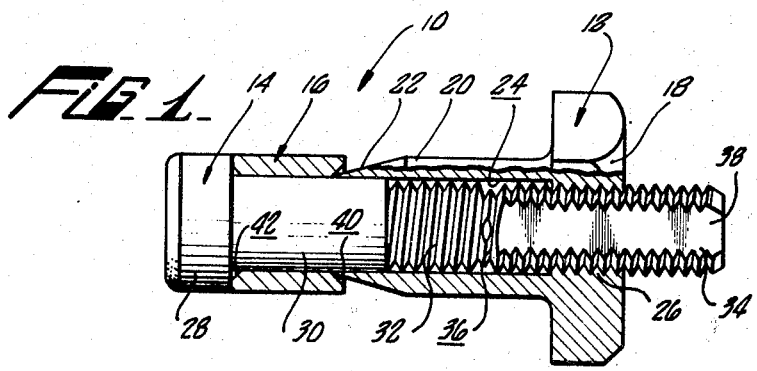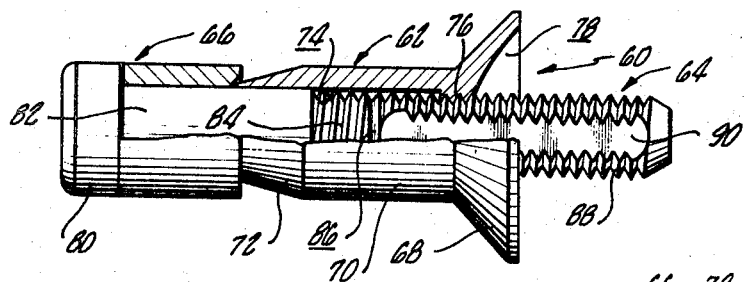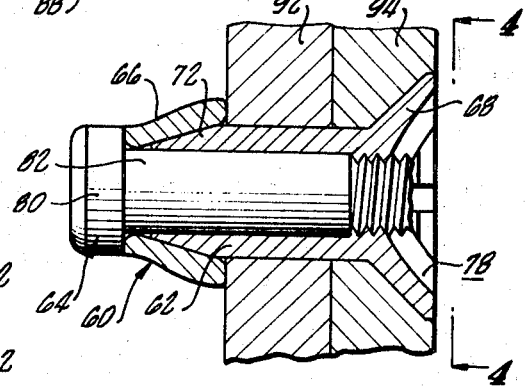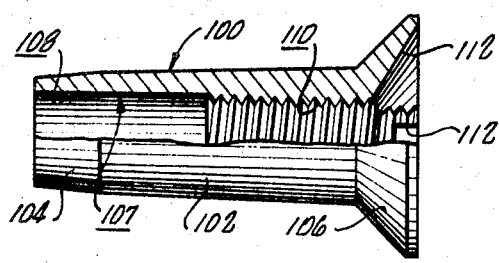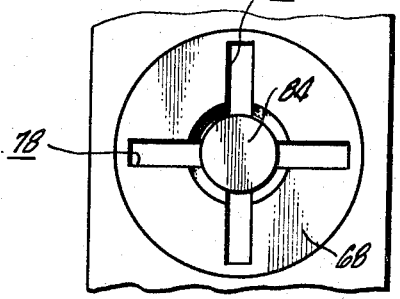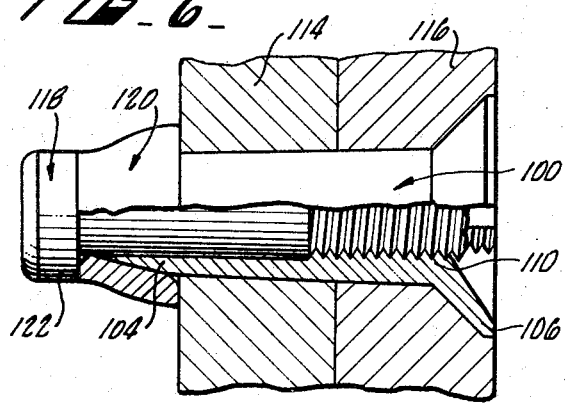
INVENTORS.
RICHARD H. BLAKELEY
EMRIC BERGERE
BY Christie, Parker & Hale
ATTORNEYS

3,443,474
BLIND FASTENER
Richard H. Blakeley, Encino, and Emric Bergere, Los Angeles, Calif., assignors to VSI Corporation, Pasadena, Calif., a corporation of Illinois
Filed Dec. 27, 1967, Ser. No. 693,957
Int. Cl. F16b *13/04, 33/04*
U.S. Cl. 85—72                                          6 Claims

ABSTRACT OF THE DISCLOSURE

A three-piece blind fastener, having a nut, a core bolt and an expansible sleeve, is set in two or more sheets of material by drawing the core bolt's head toward the blind side of a sheet, engaging the sleeve with the head and expanding it over a nose on the nut until the sleeve engages the blind side. The number of engageable threads of the nut and the core bolt is limited at a minimum to that number required to transmit a sufficient axial load through the core bolt head to expand the sleeve and set the fastener. The maximum number of threads is limited to that number required to sustain the ultimate tensile load capacity of the core bolt.

Background of the invention

This invention relates to fasteners in general and, more in particular, to an improvement in three-piece blind fasteners.

The present invention relates to the type of three-piece blind fastener having a nut, a headed core bolt and an expandable sleeve. The core bolt has a threaded shank with a breakneck portion separating the shank from a threaded breakoff portion. The nut has a head at one end to provide axial restraint and a tapered nose at its other end which extends beyond the blind side of the sheets in which the nut has been placed. The sleeve is interposed between the nut's nose and the core bolt head. The fastener is set by rotating the core bolt with a driving tool engaged on the threads of the breakoff portion while holding the nut in the sheets. The core bolt head is drawn inwardly towards the blind side of the workpiece to expand the sleeve over the conical section of the nut until the sleeve abuts the workpiece. Upon reaching a predetermined stress, the breakoff or driving portion of the core bolt severs from the shank at the breakneck groove. Axial restraint is provided in the set fastener by the expanded sleeve and the head of the nut. This type of fastener is described in U.S. Patent 2,765,699 to J. La Torre.

The type of fastener just described is extensively used as a substitute for standard nuts and bolts in aerospace and aircraft applications where high speed and ease of installation are required. In service, the sheets secured by the fasteners often experience shear displacement forces which tend to move the sheets with respect to one another along their abutting interfaces. The shear forces are often cyclic. This cyclic loading of the sheets creates a condition where the fastener system may fail in fatigue. The possibility of fatigue failure may be reduced by preventing movement of the sheets with respect to each other. The tendency of movement is reduced by a large clamp-up or preload force exerted by the fastener on the sheets and acting normal to the shear forces.

The large amount of preload required to resist fatigue failure in a panel system is often not obtained with the type of three-piece fastener described because much of the force applied to set the fastener is lost in thread friction and expanding the sleeve. The preload force is applied through the core bolt when the fastener is set. The core bolt head exerts a force on the sleeve which bears on the back side of the sheets. The nut's head and the expanded sleeve maintain the preload. Because the core bolt transmits the preload force, its strength determines the maximum amount of force which can be applied to obtain a high preload. A considerable amount of the setting force is required to expand the sleeve and draw it over the conical surface of the nut. This force substracts from the total force available in preload. In addition, prior art three-piece fasteners of the type discussed here lose a considerable amount of the force otherwise available for clamp-up through friction in the threads between the core bolt and the nut. In short, much of the force available to produce clamp-up is dissipated in thread friction, and this in combination with the force required to expand the sleeve often results in inadequate clamp-up.

Summary of the invention

The present invention provides a high ultimate strength, three-piece blind fastener having a limited number of engageable core bolt and nut threads resulting in a fastener which has considerable clamp-up or preload capacity.

The fastener of the invention is a three-piece blind fastener which includes a nut, a core bolt and a sleeve with a limited number of engageable core bolt and nut threads. The nut has a conical nose at one end for expanding the sleeve, a head at the other end to provide axial restraint, and an internally threaded axial bore to receive the core bolt. The nut is adapted for insertion through a hole in two or more sheets which have a driving and a blind side. In its set position, the nose extends beyond the blind side of the sheets with the head on the driving side. The core bolt has a head, a threaded shank portion and a breakoff portion. The breakoff portion is separated from the shank portion by a breakneck groove. The bolt is capable of threaded receipt in the axial bore of the nut portion with the breakoff portion extending outwardly and away from the driving side and the core bolt head extending outwardly of the conical nose of the nut for expanding the sleeve. The sleeve is interposed, before the fastener is set, between the core bolt head and the nut's nose and is typically in the form of a cylinder having an axial bore with starting chamfers on the leading internal edges of the bore.

The number of engageable threads between the core bolt shank and the nut portion is limited to that number required at a minimum to transmit sufficient axial load through the core bolt head to expand the sleeve and set the fastener with a high preload. The maximum number of threads corresponds to that number required to sustain the ultimate tensile load capacity of the core bolt.

The number of engageable threads between the core bolt shank and the internally threaded bore of the nut is preferably given by the following formulas:

$$N_{min} = 2T_{min}/P\pi DF_s \quad (1)$$

and $$N_{max} = 2T_{ult}/P\pi DF_s \quad (2)$$

where:

$N_{min}$ = minimum number of engageable threads,
$N_{max}$ = maximum number of engageable threads,
$T_{min}$ = the minimum tension load, in units of force, on the core bolt required to expand the sleeve and set the fastener with the desired preload,
$T_{ult}$ = ultimate tensile load capacity of the core bolt measured in units of force,
$P$ = the pitch of the engageable threads,
$D$ = the pitch diameter of the engageable threads, and
$F_s$ = the ultimate shear stress strength of the nut.

Formulas 1 and 2 apply when the basic material strength of the nut is equal to or less than the material strength of the core bolt.

One preferred form of the three-piece fastener of the present invention employs an externally tapered nut body which converges towards the nut's conical nose portion. The tapered body of the nut provides the practical capability of an interference fit between the nut and the walls of the hole in which it is set. This interference fit increases the fatigue life of the fastener system because it eliminates the possibility of movement between the nut body and the sheets.

It is also preferred to effect the thread limitations previously described by limiting the number of threads in the nut and having the threads as close to the driving side of the nut as practical. This results in an installed fastener having very few threads in shear.

The fastener is set by rotating the core bolt while restraining the nut against rotation to draw the core bolt head towards the blind side of the workpiece. As rotation progresses, the core bolt head engages the sleeve and forces it over the conical portion of the nut and into engagement with the blind side of the sheets. When a predetermined stress is present in the core bolt, the breakoff portion severs at the breaking neck.

The present invention offers a three-piece blind fastener which has considerably enhanced clamp-up or preload capabilities over those types of three-piece blind fasteners employing fully threaded core bolts and nuts. The number of threads is limited at a minimum to that number required to set the fastener and transfer the desired preload, and at a maximum to that number required to sustain the ultimate tensile stress of the core bolt. These limitations result in a considerable amount of the setting load applied to the core bolt being manifested in preload. This increase in available preload results from a reduction in the friction force between the threads of the nut and core bolt. Stated in terms of available force, the setting force applied to the core bolt is equal to the sum of the preload, the force required to upset the sleeve and the friction force between the threads of the bolt and nut; by limiting the number of threads, a greater amount of the setting force is available in preload. Typically, the preload value on the sheets in which the fastener is installed is between 50 to 65 percent of the ultimate strength of the core bolt. This preload is within the elastic limits of the core bolt and nut. However, in some applications it may be desirable to have an even higher preload, in which case the elastic limits of the core bolt and nut may be exceeded somewhat.

The thread limitation also results in the ability to use a sleeve fabricated from a relatively hard material because there is more force available to upset the sleeve. Harder sleeve materials result in a positive lock of the sleeve on the shank of the core bolt and the nut's nose.

Another advantage inherent with the thread-limited blind fastener of this invention is in the fabrication of the threads in the nut. This type of fastener can become relatively long with respect to its diameter resulting in very large length-to-diameter ratios for nut threads. The tapping of the nut becomes more difficult with longer fasteners because a considerable amount of heat is produced in the threading process if the bore of the nut is tapped its entire length. The large number of threads also causes the tapping tool to wear, resulting in a change of its thread shape from the optimum. The high temperature produced in the nut from a worn tap causes the nut to expand during the tapping process resulting in lead deviations in the nut's threads.

The strength of the fastener is also increased by the limited number of threads. By limiting the number of threads in the nut portion, the number of threads in shear is reduced. As is well known, the shear strength through the threaded area of the fastener is reduced because the effective amount of material to resist shear is less than that obtained in a solid shank.

Another advantage, attendant with the fastener of this invention having a tapered nut body, is a further increase in the strength of the fastener and structure in which it is installed. By virtue of the taper, an interference fit between the nut and its mating hole is possible. Particularly in thin sheets, interference engagement between the nut and the sheets, at least through the driving side sheet and faying surface, prevents axial misalignment of the fastener upon shear loading. Such a fit is not generally possible with cylindrical nuts because a small but discernible clearance between the nut body and its hole is usually present. Upon application of a shear force, the body of the cylindrical fastener will tilt and contact its mating hole at the faying surface in a relatively small area. If the shear load is sufficiently high, this small bearing area can result in permanent deformation of sheet material. Permanent deformation of the sheet results in loss of contact between attached sheets and failure of the fastener system.

These and other features, aspects and advantages of the present invention will become more apparent from the following description, claims and drawings.

*Description of the figures*

FIGURE 1 is a view, partly in half section, of one embodiment of the present invention;

FIGURE 2 is a view, partly in half section, of another embodiment of the present invention;

FIGURE 3 shows the embodiment of FIGURE 2 set in two sheets;

FIGURE 4 is a view of the embodiment shown in FIGURE 3 taken along line 4—4;

FIGURE 5 is a view, partly in half section, of a nut of an alternate embodiment of the present invention; and FIGURE 6 is a view of an installed fastener employing the nut of FIGURE 5.

*Description of the preferred embodiments*

The fastener shown in FIGURE 1 is indicated in general by reference numeral 10. Fastener 10 includes a nut 12, a core bolt 14 and a sleeve 16.

Nut 12 includes a hexagonal head 18 having wrenching flats to restrain the fastener against rotation when it is being installed. A body 20 of nut 12 extends from head 18 to a nose portion 22. Body 20 is generally cylindrical, while nose portion 22 is conical with its taper converging away from head 18. An axial bore 24 extends through nut 12 and is threaded a prescribed amount in head 18. These threads are shown by reference numeral 26.

Core bolt 14 includes a head 28, a smooth shank portion 30 and a threaded shank portion 32. The bolt also has a breakoff portion 34 with a pair of wrenching flats. A breakneck groove 36 separates threaded portion 32 of the core bolt shank from breakoff portion 34. One of these wrenching flats is shown by reference numeral 38; the complementary wrenching flat is disposed on the other side of breakoff portion 34 parallel to wrenching flat 38. Core bolt 14 will fail at breakneck groove 36 when a predetermined tension is reached. This failing feature is well known and therefore will not be described in detail.

Sleeve or collar 16 is disposed for a close fit around the smooth cylindrical portion 30 of core bolt 14. The sleeve includes a pair of annular, interior chamfers 40 and 42. Chamfer 40 is provided to allow the end of nose 22 to begin expansion of sleeve 16 over the nose into abutting relationship with a workpiece. This will be described subsequently. Sleeve 16 is made of relatively hard material, compared with the material previously employed in prior art sleeves, in order to create greater locking action against the smooth shank portion of core bolt 14 and against the conical surface of nose 22.

FIGURE 2 illustrates an alternate embodiment of the fastener of the present invention. A flush head fastener 16 includes a nut 62, a core bolt 64 and a sleeve 66. Nut 62 includes a conical head 68 which adapts the fastener for flush mounting in a sheet. The nut includes a cylindrical body 70 which extends inwardly from head 68 to a nose portion 72. Nose portion 72 is conical with its taper converging away from head 68. Nut 62 includes internal axial bore 74 having a limited number of threads 76 in body 70 and head 68. Head 68 includes a plurality of wrenching recesses 78 as is best illustrated in FIGURE 4.

Core bolt 64 includes a head 80 which is integral with a generally cylindrical and smooth shank 82. The smooth shank merges into a threaded shank portion 84. A breakneck groove 86 separates shank 82 from a breakoff portion 88. Breakoff portion 88 includes a pair of complementary wrenching flats, one of which is shown by reference numeral 90.

FIGURE 3 depicts the embodiment of the invention shown in FIGURE 2 as it is set in a pair of abutting sheets. Sheets 92 and 94 are held together by fastener 60 in the following manner. Nut 62 is passed through a hole in these sheets with its conical head 68 bottomed in a counterbore in sheet 94. Core bolt 64 and sleeve 66 are inserted with nut 62 through the hole. A driving tool engages flat 90 and its complementary flat to rotate core bolt 64 and bring head 80 close to the back side of sheet 92. During this driving action, wrenching recesses 78 are engaged by a tool to prevent rotation of nut 62 and prevent the latter's axial displacement. During the driving action, an axial force will be transmitted through core bolt 64 and its head 80 to sleeve 66. This axial force will push sleeve 64 over nose 72 until the inward edge of sleeve 66 bears against the blind side of sheet 92. The fastener is then set with a high axial load acting between sheets 92 and 94. Sleeve 66, as was previously mentioned, is made of relatively hard material. This hard material provides a substantial lock between the sleeve and shank portion 82 of core bolt 64. A high clamping force will also act at the interface between nose 72 and the interior bore of sleeve 66.

FIGURE 4 illustrates wrenching recesses 78 in head 68. These wrenching recesses, as is well known, provide the means for restraining nut portion 62 while the fastener is being set.

FIGURE 5 illustrates an alternate preferred form of the nut of the fastener of the present invention. Nut 100 includes a tapered body 102 which tapers towards a nose 104 from a head 106. This taper provides a means for cooperating with a hole, which may be tapered, in a pair of sheets to add to the fatigue resistance of the fastener and its sheets. As in the previously described embodiments, nose 104 is tapered towards the inward end of the nut to provide an expansion surface for a sleeve. An axial bore 107 extends through nut 100 for receipt of a core bolt. The axial bore includes a smooth portion 108 and a threaded portion 110. The diameter of smooth portion 108 is substantially equal to the major diameter of the threaded portion 110. Wrenching recesses 112 are provided to restrain rotational movement of the fastener when it is installed.

FIGURE 6 illustrates nut 100 as it is installed in a pair of sheets 114 and 116. A core bolt 118 is in threaded engagement with threads 110 of nut 100. A sleeve 120 has been expanded by the action of nose 104 of nut 100 and head 122 of core bolt 118 during the driving of the fastener. This setting of the fastener has been previously described.

The previously described embodiments all employ a limited number of engageable threads to increase the preload of the fastener in its installed condition. This preload is a measure of the clamping force acting between the sheets secured by the fastener. As such, the force is also a measure of reaction force of the nut head and expanded sleeve against the sheets. The minimum number of threads required is dictated by the setting requirements of the fastener. The axial force required to upset the sleeve is transmitted through the core bolt. This axial force produces a reaction force acting in the nut's threads. The strength of the threads engaged by the core bolt and the nut must be sufficient to upset the sleeve and obtain the required preload. If the number of threads is too small, the requisite axial force will not be transmitted to the sleeve because there will be a thread failure between the core bolt and the nut. On the other hand, the maximum number of threads required should be no more than is necessary to sustain the ultimate tensile load of the core bolt. With more threads, a higher proportion of the applied force is diverted to overcoming thread friction. These considerations are embodied in Formulas 1 and 2 previously presented. In these formulas, $T_{min}$ is given as the minimum tension load on the core bolt required to expand the sleeve and set the fastener. This force is the force which the engaged threads must withstand without failure. The minimum tension load is determined with the knowledge of the amount of force required to set the sleeve and the desired preload; the load is substantially the sum of these two values. $T_{ult}$ is the ultimate tensile load of the core bolt. The tensile strength of core bolt is generally at a minimum at the minor root diameter of the threads. $F_s$ is the ultimate shear strength of the nut, in units of stress, when the basic material strength of the nut is equal to or less than the material strength of the core bolt. The formulas presented do not account for incomplete threads resulting from, for example, entry chamfers used for tapping. Incomplete threads, however, generally represent a second order affect on the minimum and maximum number of threads derived from the relationship discussed.

The present invention has been described with reference to certain preferred embodiments. It should be understood, however, that the spirit and scope of the appended claims should not, necessarily, be limited to this description.

What is claimed is:
1. In a three-piece blind fastener of the type including
    a nut having a conical nose at one end, a head at the other end and an internally threaded axial bore, the nut being adapted for insertion through a hole in a workpiece having a driving side and a blind side with the nose extending beyond the blind side and the head on the driving side, the head being operable to restrain axial movement of the nut towards the blind side;
    a core bolt having a head, a threaded shank portion and a breakoff portion, the breakoff portion being separated from the shank portion by a breakneck groove, the bolt being capable of threaded receipt in the axial bore of the nut portion with the breakoff portion extending outwardly and away from the driving side and the bolt head extending outwardly from the nose; and
    a sleeve between the bolt head and the nose capable of expansion over the nose by the bolt head to constrain the fastener in cooperation with the nut head in the workpiece, the expansion occurring upon rotation of the core bolt to draw the bolt head towards the blind side while the nut is being rotationally and axially constrained, the breakoff portion being severable from the shank portion by failure at the breakneck groove upon the application of a predetermined torsional stress on the breakoff portion;
    an improvement which comprises;
    limiting the number of engageable threads between the core bolt shank and the nut portion to that number required:
        (a) at a minimum to transmit sufficient axial load through the core bolt head to expand the sleeve and set the fastener; and
        (b) at a maximum to sustain the ultimate tensile load capacity of the core bolt, the maximum number of threads being determined by the following formula:

$$N_{max} = 2T_{ult}/P\pi DF_s$$

where
- $N_{max}$ = maximum number of threads,
- $T_{ult}$ = ultimate tensile load capacity of the core bolt,
- $P$ = the pitch of the threads,
- $D$ = the pitch diameter of the threads, and
- $F_s$ = the ultimate shear stress strength of the nut.

2. The improvement claimed in claim 1 wherein the minimum number of threads is determined by the following formula:

$$N_{min} = 2T_{min}/P\pi DF_s$$

where
- $N_{min}$ = minimum number of threads,
- $T_{min}$ = the minimum tension load on the core bolt which is required to expand the sleeve and set the fastener,
- $P$ = the pitch of the threads,
- $D$ = the pitch diameter of the threads, and
- $F_s$ = the ultimate stress strength of the nut.

3. The improvement claimed in claim 2 wherein the nut has an externally tapered body between its head and its nose with the taper converging towards the nose.

4. A three-piece blind fastener comprising:
(a) an integral nut having a conical nose at one end, a head at the other end, a body portion between the head and nose, and an internally threaded axial bore, the conical nose converging towards its end of the nut, the nut being adapted for insertion through a hole in a workpiece having a driving side and a blind side with the nose extending outwardly of the blind side and the head on the driving side, the head being adapted to be restrained against rotation and to engage the driving side during the setting of the fastener to prevent axial movement of the nut towards the blind side;
(b) a core bolt having a head, a threaded shank and a breakoff portion, the breakoff portion being separated from the shank portion by a breakneck groove, the shank being capable of threaded receipt in the threaded axial bore of the nut with the breakoff portion extending outwardly from the driving side and the bolt head extending outwardly from the nose, the breakoff portion being adapted to be driven to thread the shank in the nut to bring the bolt head towards the blind side and separate the breakoff portion from the shank at the breakneck groove; and
(c) a sleeve between the bolt head and the nose which is capable of expansion by the nose as the bolt head is being drawn towards the blind side while the breakoff portion is being driven;
the number of shank and nut threads which are engageable with each other when the fastener is set being within the following limits:
(i) as a minimum $$N_{min} = 2T_{min}/P\pi DF_s$$

and
(ii) as a maximum $$N_{max} = 2T_{ult}/P\pi DF_s$$

where
- $N_{min}$ = minimum number of engageable threads,
- $N_{max}$ = maximum number of engageable threads,
- $T_{min}$ = the minimum tension load on the core bolt required to expand the sleeve and set the fastener,
- $T_{ult}$ = ultimate tensile load capacity of the core bolt,
- $P$ = the pitch of the engageable threads,
- $D$ = the pitch diameter of the engageable threads, and
- $F_s$ = the ultimate shear stress strength of the nut.

5. The three-piece blind fastener claimed in claim 4 wherein the nut has an externally tapered body between its head and its nose with the taper converging towards the nose.

6. The three-piece blind fastener claimed in claim 5 wherein the limited number of threads given by the formulas is in the nut at the head end of the nut's axial bore.

References Cited

UNITED STATES PATENTS

| | | | |
|---|---|---|---|
| 3,129,630 | 4/1964 | Wing et al. | 85—72 |
| 3,222,977 | 12/1965 | Vaughn | 85—72 |

FOREIGN PATENTS 145,722  3/1952  Australia.

CARL W. TOMLIN, *Primary Examiner.*

R. S. BRITTS, *Assistant Examiner.*

U.S. Cl. X.R.

85—74